United States Patent
Mitsumoto et al.

(10) Patent No.: US 10,263,256 B2
(45) Date of Patent: Apr. 16, 2019

(54) SPINEL TYPE LITHIUM NICKEL MANGANESE-CONTAINING COMPOSITE OXIDE

(71) Applicant: Mitsui Mining & Smelting Co., Ltd., Tokyo (JP)

(72) Inventors: Tetsuya Mitsumoto, Takehara (JP); Hideaki Matsushima, Takehara (JP); Shinya Kagei, Takehara (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 15/760,054

(22) PCT Filed: Sep. 16, 2016

(86) PCT No.: PCT/JP2016/077371
§ 371 (c)(1),
(2) Date: Mar. 14, 2018

(87) PCT Pub. No.: WO2017/047729
PCT Pub. Date: Mar. 23, 2017

(65) Prior Publication Data
US 2018/0261841 A1    Sep. 13, 2018

(30) Foreign Application Priority Data
Sep. 17, 2015 (JP) .................. 2015-184353

(51) Int. Cl.
| | | |
|---|---|---|
| *H01M 4/02* | (2006.01) | |
| *C01G 53/00* | (2006.01) | |
| *H01M 4/505* | (2010.01) | |
| *H01M 4/525* | (2010.01) | |
| *H01M 10/0525* | (2010.01) | |

(52) U.S. Cl.
CPC .......... *H01M 4/525* (2013.01); *C01G 53/00* (2013.01); *C01G 53/54* (2013.01); *H01M 4/505* (2013.01); *H01M 10/0525* (2013.01); *C01P 2002/32* (2013.01); *C01P 2002/52* (2013.01); *C01P 2004/61* (2013.01); *C01P 2006/11* (2013.01); *C01P 2006/12* (2013.01); *C01P 2006/40* (2013.01); *H01M 2004/021* (2013.01); *H01M 2004/028* (2013.01)

(58) Field of Classification Search
CPC .................................................. C01G 53/56
See application file for complete search history.

(56) References Cited

U.S. PATENT DOCUMENTS

| | | | |
|---|---|---|---|
| 6,337,158 B1 | 1/2002 | Nakajima et al. | |
| 2002/0164528 A1 | 11/2002 | Sunagawa et al. | |
| 2008/0093581 A1 | 4/2008 | Peres et al. | |
| 2013/0224585 A1 | 8/2013 | Oh et al. | |
| 2014/0034872 A1 | 2/2014 | Watanabe et al. | |
| 2015/0147652 A1* | 5/2015 | Shibamura ............ | H01M 4/485 429/223 |
| 2015/0255791 A1 | 9/2015 | Kagei et al. | |

FOREIGN PATENT DOCUMENTS

| | | |
|---|---|---|
| JP | 1173962 A | 3/1999 |
| JP | 2000235857 A | 8/2000 |
| JP | 2002251996 A | 9/2002 |
| JP | 2003197194 A | 7/2003 |
| JP | 2012116720 A | 6/2012 |
| JP | 201320736 A | 1/2013 |
| JP | 2013543244 A | 11/2013 |
| WO | 2013161949 A1 | 12/2015 |
| WO | 2014050812 A1 | 8/2016 |

* cited by examiner

*Primary Examiner* — Peter F Godenschwager
(74) *Attorney, Agent, or Firm* — The Webb Law Firm

(57) ABSTRACT

Relating to a 5 V-class spinel type lithium nickel manganese-containing composite oxide having an operating potential of 4.5 V or more with respect to a Li metal reference potential, the present invention proposes a composite oxide being capable of improving cycle properties while suppressing the amount of gas generation under high temperature environments and of increasing thermodynamical stability of a positive electrode in a fully charged state. Proposed is a spinel type lithium nickel manganese-containing composite oxide represented by a general formula [Li(Li$_a$Ni$_y$Mn$_{2-a-b-y-z-\alpha}$Ti$_b$Al$_z$M$_\alpha$)O$_{4-\delta}$] (where 0<a, 0<b, 0.30≤y<0.60, 0<z, 0≤α, 2-a-b-y-z-α<1.7, 3≤b/a≤8, 0.1<b+z+α, 0<z/b≤1, and M represents one or two or more metal elements selected from the group consisting of Mg, Fe, Co, Ba, Cr, W, Mo, Y, Zr, Nb, and Ce).

15 Claims, 1 Drawing Sheet

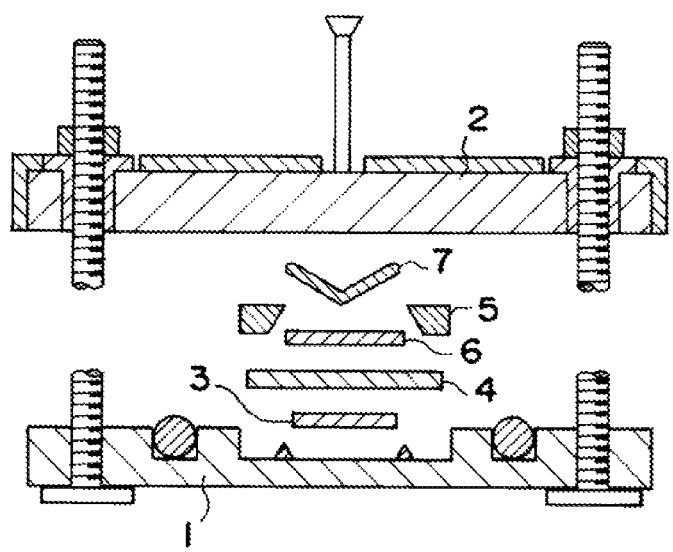

SPINEL TYPE LITHIUM NICKEL MANGANESE-CONTAINING COMPOSITE OXIDE

CROSS-REFERENCE TO RELATED APPLICATIONS

This application is the United States national phase of International Application No. PCT/JP2016/077371 filed Sep. 16, 2016, and claims priority to Japanese Patent Application No. 2015-184353 filed Sep. 17, 2015, the disclosures of which are hereby incorporated in their entirety by reference.

TECHNICAL FIELD

The present invention relates to a spinel type lithium nickel manganese-containing composite oxide that can be used as a positive electrode active material for lithium secondary batteries, and more particularly, to a spinel type lithium nickel manganese-containing composite oxide having an operating potential of 4.5 V or more with respect to a Li metal reference potential (referred to as "5 V-class").

BACKGROUND ART

Lithium secondary batteries have characteristics of high energy density, long life and the like. Therefore, lithium secondary batteries are widely used as power supplies for electric appliances such as video cameras, portable electronic devices such as laptop computers and mobile telephones, and electric tools such as power tools. Recently, lithium secondary batteries are also applied to large-sized batteries that are mounted in electric vehicles (EVs), hybrid electric vehicles (HEVs) and the like.

A lithium secondary battery is a secondary battery having a structure in which, at the time of charging, lithium begins to dissolve as ions from the positive electrode and moves to the negative electrode to be stored therein, and at the time of discharging, lithium ions return from the negative electrode to the positive electrode, and it is known that the higher energy density of the lithium secondary battery is attributable to the electric potential of the positive electrode material.

Known examples of this kind of positive electrode active material for lithium secondary batteries include lithium transition metal oxides having a layered structure, such as $LiCoO_2$, $LiNiO_2$, and $LiMnO_2$, and lithium transition metal oxides having a manganese-based spinel structure (Fd-3 m), such as $LiMn_2O_4$ and $LiNi_{0.5}Mn_{1.5}O_4$.

Since spinel type lithium nickel manganese-containing composite oxides of this kind are provided at low prices of raw materials, are non-toxic and safe, and have properties of being resistant to over-charging, attention is paid to them as the next-generation positive electrode active material for the large-sized batteries of electric vehicles (EVs), hybrid electric vehicles (HEVs) and the like. Furthermore, since spinel type lithium transition metal oxides that are capable of three-dimensionally intercalating and deintercalating of Li ions have superior output characteristics compared with lithium transition metal oxides having a layered structure such as $LiCoO_2$, it is expected to be used in an application where excellent output characteristics are required, such as in batteries for EVs and batteries for HEVs.

Among others, it has been known to have an operating potential at near 5 V by substituting a part of the Mn sites in $LiMn_2O_4$ with other transition metals (Cr, Co, Ni, Fe, or Cu). Thus, at present, development of a (5 V-class) spinel type lithium manganese-containing composite oxide having an operating potential of 4.5 V or more (also referred to as "5 V-class spinel") is being actively carried out.

For example, Patent Document 1 discloses, as a positive electrode active material for lithium secondary batteries exhibiting an electromotive force of 5 V-class, a high capacity spinel type lithium manganese composite oxide positive electrode active material, comprising a spinel type lithium manganese composite oxide added with chromium as an essential additive component, and further, nickel or cobalt.

Patent Document 2 discloses a crystal having a spinel structure, $LiMn_{2-y-z}Ni_yM_zO_4$ (wherein M represents at least one selected from the group consisting of Fe, Co, Ti, V, Mg, Zn, Ga, Nb, Mo and Cu, $0.25 \leq y \leq 0.6$, and $0 \leq z \leq 0.1$), which performs charging and discharging at a potential of 4.5 V or more with respect to a Li metal.

Patent Document 3 discloses a spinel type lithium manganese composite oxide represented by $Li_a(M_xMn_{2-x-y}A_y)O_4$ (wherein $0.4<x$, $0<y$, $x+y<2$, $0<a<1.2$; M includes one or more metal elements selected from the group consisting of Ni, Co, Fe, Cr and Cu, and includes at least Ni; and A includes at least one metal element selected from Si and Ti, provided that when A includes only Ti, the value of the ratio of A, y, is $0.1<y$), as a positive electrode material for higher energy density lithium ion secondary batteries having a high voltage of 4.5 V or more with respect to Li.

Patent Document 4 discloses, as a positive electrode active material which has a high capacity density by having both the tap density of the positive electrode active material and the initial discharge capacity of a secondary battery formed by using the positive electrode active material, a lithium nickel manganese composite oxide having a spinel structure represented by a formula (I): $Li_{1+x}Ni_{0.5-1/4x-1/4y}Mn_{1.5-3/4x-3/4y}B_yO_4$ (wherein in the formula (I), x and y are $0 \leq x \leq 0.025$, and $0 < y \leq 0.01$), characterized in that the median diameter is 5 to 20 μm, the coefficient of variation of particle size is 2.0 to 3.5%, and the BET specific surface area is 0.30 to 1.30 m/g.

Further, Patent Document 5 discloses, as a new 5 V-class spinel which can suppress the amount of gas generation during high temperature cycles, a spinel type lithium nickel manganese-containing composite oxide represented by a formula $Li[Ni_yMn_{2-(a+b)-y-z}Li_aTi_bM_z]O_4$ (wherein $0 \leq z \leq 0.3$, $0.3 \leq y \leq 0.6$, and M is at least one or more metal elements selected from the group consisting of Al, Mg, Fe and Co), in which in the above formula, the following relationships are satisfied: $a>0$, $b>0$, and $2 \leq b/a \leq 8$.

CITATION LIST

Patent Document 1: JP H11-73962 A
Patent Document 2: JP 2000-235857 A
Patent Document 3: JP 2003-197194 A
Patent Document 4: JP 2012-116720 A
Patent Document 5: WO 2013/161949 A

SUMMARY OF THE INVENTION

Spinel type lithium nickel manganese-containing composite oxides capable of realizing the high energy density lithium ion secondary batteries that have been suggested hitherto, particularly 5 V-class spinels having an operating potential of 4.5 V or more with respect to a Li metal reference potential have a problem of improving cycle properties as well as a problem that the amount of gas generation under high temperature environments is generally high.

Further, in regard to the lithium ion secondary batteries, enhancing the safety is always one of the important development problems. Particularly, since there is a possibility of resulting in ignition when abnormal heat generation is occurred by an internal short circuit, an overcharge, or the like, it is necessary to enhance thermal stability of each of the battery materials constituting the lithium ion secondary battery, and a positive electrode material is also particularly required to enhance thermodynamical stability of a positive electrode in a fully charged state.

Thus, the present invention relates to a 5 V-class spinel type lithium nickel manganese-containing composite oxide having an operating potential of 4.5 V or more with respect to a Li metal reference potential, and provides a novel 5 V-class spinel type lithium nickel manganese-containing composite oxide in which the gas generation under high temperature environments can be suppressed, the cycle properties can be improved, and the thermodynamical stability of a positive electrode in a fully charged state can be also increased.

The present invention proposes a spinel type lithium nickel manganese-containing composite oxide represented by a general formula [Li(Li$_a$Ni$_y$Mn$_{2-a-b-y-z-\alpha}$Ti$_b$Al$_z$M$_\alpha$)O$_{4-o}$] (where 0<a, 0<b, 0.30≤y<0.60, 0<z, 0≤α, 2-a-b-y-z-α<1.7, 3≤b/a≤8, 0.1<b+z+α, 0<z/b≤1, and M represents one or two or more metal elements selected from the group consisting of Mg, Fe, Co, Ba, Cr, W, Mo, Y, Zr, Nb, and Ce).

The present invention also proposes a spinel type lithium nickel manganese-containing composite oxide represented by a general formula [Li(Li$_a$Ni$_y$Mn$_{2-a-b-y-z-\alpha}$Ti$_b$Al$_z$M$_\alpha$)O$_{4-o}$] (where 0<a≤0.20, 0.08≤b, 0.30≤y<0.60, 0<z<0.15, 0≤α, 2-a-b-y-z-α<1.7, 3≤b/a≤8, 0.1<b+z+α≤0.3, 0<z/b≤1, and M represents one or two or more metal elements selected from the group consisting of Mg, Fe, Co, Ba, Cr, W, Mo, Y, Zr, Nb, and Ce).

The spinel type lithium nickel manganese-containing composite oxide proposed by the present invention has an operating potential of 4.5 V or more with respect to a Li metal reference potential, and can improve cycle properties while suppressing an amount of gas generation under high temperature environments. Furthermore, thermodynamical stability of a positive electrode in a fully charged state can be increased, such as an exothermic peak temperature can be shifted toward a high-temperature side in an evaluation using a DSC (differential scanning calorimeter).

Therefore, the spinel type lithium nickel manganese-containing composite oxide proposed by the present invention can be suitably used as a positive electrode active material for various lithium batteries.

BRIEF DESCRIPTION OF DRAWINGS

FIG. 1 is an outline diagram of a cell for electrochemical evaluation, TOMCEL (registered trademark), used for battery evaluations in Examples.

DESCRIPTION OF THE INVENTION

Next, the invention will be described based on embodiments. However, the present invention is not intended to be limited to the exemplary embodiments described below.
<Present Spinel>
The spinel type lithium nickel manganese-containing composite oxide according to one example of embodiments of the present invention (referred to as "present spinel") is a spinel type (space group: Fd-3m or P4$_3$32) lithium nickel manganese-containing composite oxide represented by a general formula [Li(Li$_a$Ni$_y$Mn$_{2-a-b-y-z-\alpha}$Ti$_b$Al$_z$M$_\alpha$)O$_{4-o}$] (where a, b, y, z, and α are numerical values).

The present spinel can exhibit an operating potential of 4.5 V or more (5 V-class).

The present spinel has one characteristic that the present spinel is a 5 V spinel comprising elements of both Ti and Al as elements having an effect of improving structural stability by strengthening a bonding force with oxygen.

By comprising the elements of both Ti and Al, it could be confirmed that an exothermic peak temperature of DSC was shifted toward a high-temperature side compared with a 5 V spinel, for example, having only one of Ti or Al. It can be expected that this was because the crystal structure was more stabilized by comprising the elements of both Ti and Al, and thus the ease of oxygen release of the 5 V spinel when touching to an electrolytic solution could be suppressed. Consequently, the reactivity with the electrolytic solution can be reduced, and the amount of gas generation due to decomposition of the electrolytic solution can be reduced even in a temperature range where the battery is being stored.

However, other than the crystal structure, it can be also considered that this is because an influence such as uneven distribution and concentration of the electrolytic solution on a particle surface since the exothermal of DSC is occurred when oxygen is supplied to the electrolytic solution from the particle surface.

In the above general formula, "a" and "b" are 0<a and 0<b, and may satisfy a relationship of 3≤b/a≤8. Among others, they are preferably 3≤b/a or b/a≤7.

The term "b/a" in the above general formula means a molar ratio of Ti with respect to Li in the 16d sites, and when the ratio is in the range of 3≤b/a≤8, the amount of gas generation can be reduced.

In addition, from the viewpoints of the stabilization of the spinel structure and the production stability, "a" is more preferably 0<a≤0.20, and among others, it is even more preferably 0.02≤a or a≤0.10.

From the viewpoints of stabilizing the spinel structure and suppressing the gas generation, "b" is more preferably 0<b, and among others, it is even more preferably 0.08≤b or b<0.29.

From the viewpoint of maintaining the charge and discharge capacity in a high potential region, "y" in the above general formula may be 0.30≤y<0.60. Among others, it is preferably 0.32≤y or y≤0.55, and more preferably 0.35≤y or y≤0.52. If "y" is less than the above range, a decrease occurs in the 5 V capacity, and if "y" exceeds the above range, it is difficult to form a single layer.

From the viewpoint of improving the thermodynamical stability, "z" may be 0<z. Among others, it is preferably 0<z<0.15, more preferably 0.005≤z or z≤0.12, and even more preferably 0.01≤z or z≤0.10.

In addition, it is preferable that the relationship between "b" which represents a molar ratio of Ti and "z" which represents a molar ratio of Al satisfies a relationship of 0<z/b≤1 from the viewpoint of achieving both of the suppression of the gas generation and the thermodynamical stability. That is, the molar ratio of Ti is preferably larger than the molar ratio of Al. Among others, it is more preferably 0.025<z/b<1, and even more preferably 0.040≤z/b or z/b<0.75.

Also, it is preferable that the relationship among "b" which represents a molar ratio of Ti, "z" which represents a molar ratio of Al, and "α" which represents a molar ratio of M element satisfies a relationship of $0.1<b+z+\alpha$ from the viewpoint of improving the cycle property by the stabilization of the spinel structure. Among others, it is more preferably $0.1<b+z+\alpha\leq0.3$, and even more preferably $0.1<b+z+\alpha\leq0.25$.

Further, the term "2-a-b-y-z-α" in the above general formula means a molar ratio of Mn. From the viewpoints of stabilizing the spinel structure and preventing the decrease in capacity, it is preferably $2-a-b-y-z-\alpha<1.7$, more preferably $1.0<2-a-b-y-z-\alpha$ or $2-a-b-y-z-\alpha\leq1.6$, and even more preferably $1.2<2-a-b-y-z-\alpha$ or $2-a-b-y-z-\alpha\leq1.5$.

From the viewpoint of achieving both of maintaining the charge and discharge capacity and the thermodynamical stability, it is preferable that the relationship between "y" which represents a molar ratio of Ni and "z" which represents a molar ratio of Al satisfies a relationship of $0.01<z/y$. Among others, it is more preferably $0.01<z/y<0.5$, and even more preferably $0.02\leq z/y$ or $z/y<0.3$.

In the above general formula, M in the formula may be or may not be included. That is, "α" which represents a molar ratio of M may be α0.

Here, M in the formula may be, for example, one or two or more metal elements selected from the group consisting of Mg, Fe, Co, Ba, Cr, W, Mo, Y, Zr, Nb, and Ce. These elements have a common feature that they are substitution elements contributing in exhibiting an operating potential of 4.5 V or more at a Li metal reference potential, or substitution elements mainly contributing in stabilizing the crystal structure to elevate the characteristics, and thus there is a possibility that the effect of stabilizing the spinel structure can be further obtained by comprising these elements, that is, the M elements in the present spinel.

The term "4-σ" in the above general formula implies that the composite oxide may also contain oxygen deficiency, and a part of oxygen may be substituted with fluorine.

The present 5 V-class spinel may contain other elements other than Li, Mn, Ni, Ti, Al, M elements, and O if the contents are 0.5% by weight or less respectively. This is because if the content is this much amount, it may be considered that the other elements would hardly affect the performance of the present 5 V-class spinel.

In an X-ray diffraction pattern measured by a powder X-ray diffractometer (XRD) using CuKα1 ray, when the present 5 V-class spinel is fitted to a crystal structure model of a cubic crystal of a space group Fd-3m (Origin Choice 2), Rwp and S which represent the degree of coincidence of an observed intensity with a calculated intensity may be Rwp<10 or S<2.6. At this time, when Rwp and S are Rwp<10 or S<2.6, it can be said that the observed intensity and the calculated intensity are sufficiently coincident.

From such a viewpoint, Rwp is preferably Rwp<8 among the above range, and more preferably Rwp<5. S is preferably 1.0<S and S<2.3 among the above range, and more preferably S<2.1.

<Sulfur Content>

In the present spinel, the sulfur content measured by inductively coupled plasma (ICP) emission spectroscopy is preferably less than 0.20 wt %.

The sulfur content measured by inductively coupled plasma (ICP) emission spectroscopy can be considered as a substitute indicator of the amount of impurities such as $Li_2SO_4$ that are attached to the particle surface. When this sulfur content is set to less than 0.2 wt %, the amount of impurities that are attached to the particle surface can be decreased more than the desired reference. An exotherm in DSC is caused by reaction between a powder surface and an electrolytic solution, and thus it is possible to shift an exothermic peak temperature in DSC further toward a high-temperature side by decreasing the amount of impurities on the particle surface.

From such a viewpoint, the sulfur content of the present spinel is preferably less than 0.20 wt %. Among others, it is more preferably 0.10 wt % or less, and even more preferably 0.05 wt % or less.

In the present spinel, in order to make the sulfur content less than 0.20 wt %, a method of water washing can be cited. At this time, the water amount, the water temperature, the slurry concentration, or the like at the time of washing may be adjusted, and particularly preferably, the conductivity of the washing water after washing is decreased so as to be 10 mS/cm or less as a guideline and the water content rate of the cake obtained after solid-liquid separation is reduced so as to be 30% or less as a guideline. However, the method is not limited to such a method.

(Contents of Na, K, and Ca)

As described above, an exotherm in DSC is caused by reaction between a powder surface and an electrolytic solution, and thus it is possible to shift an exothermic peak temperature in DSC further toward a high-temperature side by decreasing the amount of impurities on the particle surface.

From such a viewpoint, the content of Na in the present spinel is preferably less than 300 ppm. Among others, it is more preferably less than 200 ppm, even more preferably less than 100 ppm, and still more preferably less than 60 ppm.

Further, the content of K in the present spinel is preferably less than 200 ppm. Among others, it is more preferably less than 100 ppm, even more preferably less than 70 ppm, and still more preferably less than 40 ppm.

Furthermore, the content of Ca in the present spinel is preferably less than 150 ppm. Among others, it is more preferably less than 130 ppm, and even more preferably less than 110 ppm.

In the present spinel, in order to adjust the contents of Na, K, and Ca to the above ranges, a method of water washing can be cited. At this time, the water amount, the water temperature, the slurry concentration, or the like at the time of washing may be adjusted. Particularly preferably, the conductivity of the washing water after washing is decreased so as to be 10 mS/cm or less as a guideline and the water content rate of the cake obtained after solid-liquid separation is reduced so as to be 30% or less as a guideline. However, the method is not limited to such a method.

(Average Particle Diameter (D50))

An average particle diameter (D50) of the present spinel, that is, an average particle diameter (D50) determined by a laser diffraction scattering type particle size distribution measurement method is preferably 4 to 25 μm. When the D50 is 4 μm or more, it is preferable because a problem in kneading and mixing the slurry is hardly occurred. Meanwhile, when the D50 is 25 μm or less, it is preferable because a risk that particles break through a separator and a short circuit is occurred decreases.

From such a viewpoint, the average particle diameter (D50) of the present spinel is preferably 4 to 25 μm. Among others, it is more preferably more than 4 μm or 23 μm or less, and particularly preferably 5 μm or more or 21 μm or less.

In order to adjust the D50 of the present spinel to the above ranges, it is preferable to perform an adjustment of D50 of starting materials, an adjustment of calcination temperature or calcination time, or an adjustment of D50 by crushing after the calcination. However, it is not limited to these adjustment methods.

(Specific Surface Area)

From the viewpoint of reactivity with an electrolyte solution, a specific surface area of the present spinel is preferably 0.1 to 2.0 m$^2$/g. Among others, it is more preferably 0.2 m$^2$/g or more or 1.8 m$^2$/g or less, even more preferably 1.5 m$^2$/g or less, and still more preferably 1.2 m$^2$/g or less.

It is generally a technical common sense that the larger specific surface area becomes, the larger amount of gas generation becomes. However, the present spinel is characterized in the point that the amount of gas generation can be remarkably suppressed although having a specific surface area of on the same order as conventional spinel type lithium nickel manganese-containing composite oxides.

In order to adjust the specific surface area of the present spinel to the above ranges, the present spinel may be produced by adjusting a raw material particle size, calcination temperature and time, crushing strength, or a classification level.

(Tap Density)

A tap density of the present spinel is preferably 0.9 g/cm$^3$ or more. Among others, it is more preferably 1.0 g/cm$^3$ or more or 3.0 g/cm$^3$ or less, even more preferably 1.2 g/cm$^3$ or more or 2.8 g/cm$^3$ or less, and still more preferably 1.5 g/cm$^3$ or more or 2.6 g/cm$^3$ or less.

When the tap density of the present spinel is 0.9 g/cm$^3$ or more as described above, the electrode density can be enhanced, and thus the volumetric energy density can be enhanced.

In order to set the tap density of the present spinel to 0.9 g/cm$^3$ or more, it is preferable to produce the present spinel by calcining at a high temperature of 770° C. or more, adding a material which enhances the reactivity in calcination such as a boron compound or a fluorine compound, followed by calcining, or using a dense raw material. However, it is not limited to this method.

(Strain)

A strain of the present spinel is preferably less than 0.40. Among others, it is more preferably less than 0.30, and even more preferably less than 0.25.

When the strain is less than 0.40, the framework of the spinel type lithium nickel manganese-containing composite oxide becomes sufficiently rigid, and when used as a positive electrode active material of a lithium secondary battery, the output characteristics (rate characteristics), the high-temperature cycle life characteristics, and the rapid-charge characteristics can be enhanced.

In order to adjust the strain of the present spinel to the above ranges, wet-type pulverization conditions, calcining conditions, heat treatment conditions, or the like may be adjusted. Among others, it is preferable to adjust wet-type pulverization conditions. However, it is not limited to this method.

<X-Ray Diffraction>

In the present spinel, a peak may be present in a range of 14.0 to 16.5° at 2θ in an X-ray diffraction pattern measured by a powder X-ray diffractometer (XRD) using CuKα1 ray.

When a peak is present in a range of 14.0 to 16.5° at 2θ in the X-ray diffraction pattern, a shoulder at near 4 V is disappeared, a plateau region at near 4.5 V is expanded, a high potential capacity region is expanded, and thus energy density is increased and the amount of gas generation can be suppressed, compared to the spinel in which the peak is not present in a range of 14.0 to 16.5° at 2θ in the X-ray diffraction pattern.

(Electron Diffraction Image Analysis)

The present 5 V-class spinel may also have features that, in an electronic diffraction image from a transmission electron microscope (TEM), a diffraction spot which is observed in the P4$_3$32 structure is confirmed. When the indexing of the diffraction spot and the calculation of incident direction are performed as the P4$_3$32 structure, it is more preferable that a diffraction spot of 011 is confirmed between diffraction spots of 000 and 022 in a diffraction image of incidence from crystal zone axis <100>.

In the electron diffraction image from TEM, when a diffraction spot which is observed in the P4$_3$32 structure is confirmed, a shoulder at near 4 V is disappeared, a plateau region at near 4.5 V is expanded, a high potential capacity region is expanded, and thus energy density is increased and the amount of gas generation can be suppressed, compared to the spinel in which the above diffraction spot is not confirmed in the P4$_3$32 structure.

<Production Method of Present Spinel>

The present spinel can be obtained by mixing raw materials such as a lithium compound, a manganese compound, a nickel compound, a titanium compound and an aluminum compound, and the other materials as required, pulverizing the mixture using a wet-type pulverizer or the like, subsequently granulating and drying the pulverization product using a thermal spray dryer or the like, subjecting the granulating and drying product to calcination and a heat treatment, and classifying the resultant product as necessary.

At this time, it is preferable to design the raw material composition such that the molar ratio of Ti with respect to Li in the 16d sites where Mn resides, is to be 3 to 8.

However, the production method for the present spinel is not limited to such a production method. For example, a granulated powder that is supplied to calcination may also be produced according to a so-called co-precipitation method. Further, washing may be carried out in the respective stages (see "Washing" described below).

Examples of the lithium compound include lithium hydroxide (LiOH), lithium carbonate (Li$_2$CO$_3$), lithium nitrate (LiNO$_3$), LiOH.H$_2$O, lithium oxide (Li$_2$O), another fatty acid lithium, and lithium halides. Among others, hydroxide salt, carbonate salt, and nitrate salt of lithium are preferable.

The manganese compound is not particularly limited. For example, manganese carbonate, manganese nitrate, manganese chloride, manganese dioxide, dimanganese trioxide, trimanganese tetraoxide, and the like can be used, and among others, manganese carbonate and manganese dioxide are preferable. Among others, electrolytic manganese dioxide that is obtained by an electrolytic method is more preferable.

The kind of the nickel compound is also not particularly limited, and it is possible to use, for example, nickel carbonate, nickel nitrate, nickel chloride, nickel oxyhydroxide, nickel hydroxide, nickel oxide, and the like. Among others, nickel carbonate, nickel hydroxide, and nickel oxide are preferable.

As the titanium (Ti) and aluminum salt compounds, carbonate salt, nitrate salt, chloride, oxyhydroxide salt, hydroxide, oxide, and the like of metals such as titanium (Ti) and aluminum (Al) can be used.

As the method for mixing the raw materials, it is preferable to add a liquid medium such as water or a dispersant to the raw materials and to form a slurry by wet mixing them together, and it is preferable to pulverize the slurry thus obtained using a wet-type pulverizer. However, it may be dry-type pulverized.

In addition, it is preferable to pulverize the resulting product such that the average particle diameter (D50) would be 0.1 to 1.0 µm.

The granulation method may be a wet-type method or a dry-type method as long as various raw materials that have been pulverized in the previous step are dispersed in granulated particles without being separated, and may be an extrusion granulation method, a rolling granulation method, a fluidized bed granulation method, a mixing granulation method, a spray drying granulation method, a pressure molding granulation method, or a flake granulation method using a roll or the like. However, in the case of performing the wet-type granulation, sufficient drying before the calcination is needed. Examples of the drying method include known drying methods such as a spray thermal drying method, a hot-air drying method, a vacuum drying method, and a freeze-drying method, and among others, the spray thermal drying method is preferable. The spray thermal drying method is preferably performed using a thermal spray drying machine (spray dryer).

The calcination is preferably performed in a calcining furnace under an air atmosphere, an atmosphere whose oxygen partial pressure is adjusted, a carbon dioxide gas-containing atmosphere, or another atmosphere so as to maintain a temperature of 770 to 1,000° C., preferably 800 to 1,000° C. (: meaning the temperature when a thermocouple is brought into contact with a calcination product in a calcining furnace) for 0.5 to 300 hours. At this time, it is preferable to select calcining conditions in which transition metals are dissolved at an atomic level to form a single phase.

The kind of the calcination furnace is not particularly limited. The calcination can be performed using, for example, a rotary kiln, a stationary furnace, or other calcination furnaces.

The heat treatment is preferably performed under an air atmosphere, an atmosphere whose oxygen partial pressure is adjusted, a carbon dioxide gas-containing atmosphere, or another atmosphere, in an environment of 500 to 800° C., preferably 700° C. or more and 800° C. or less for 0.5 to 300 hours so as to easily incorporate oxygen into the crystal structure. At this time, when the temperature is lower than 700° C., the effect of the heat treatment is not easily obtained, and there is a risk that oxygen may not be incorporated. On the other hand, when the heat treatment is performed at a temperature which is higher than 800° C., desorption of oxygen begins, and the effect intended by the present invention cannot be obtained.

In the heat treatment, the heat treatment atmosphere may be an atmosphere where the overall pressure of the treatment atmosphere is a pressure which is higher than air pressure (0.1 MPa), for example, more than 0.19 MPa, and more preferably 0.20 MPa or more, as necessary.

However, when the overall pressure of the treatment atmosphere is too high, there is a possibility that the production becomes unstable due to a problem on strength of the pressurized furnace. Therefore, from such a viewpoint, the heat treatment is preferably performed at an atmosphere pressure of 1.5 MPa or less, and more preferably 1.0 MPa or less.

By performing the heat treatment in such a pressuring state, oxygen is more easily incorporated, and thus the oxygen deficiency can be further suppressed.

(Washing)

An object to be treated that is subjected to washing may be, for example, each of the raw materials before mixing of the raw materials, a raw material mixed powder after mixing of the raw materials, a treated powder after the heat treatment, a treated object obtained from calcination, and further a treated powder obtained from crushing and classification described later. One or two or more kinds of these may be washed.

In the washing, it is preferable to bring an object to be treated (powder) into contact with a polar solvent, and to wash the powder so as to separate impurities contained in the powder.

For example, the object to be treated (powder) and a polar solvent are mixed and stirred to obtain a slurry, and the slurry thus obtained may be subjected to solid-liquid separation by filtration or the like, so as to eliminate impurities. At this time, the solid-liquid separation may be performed at a subsequent step.

Meanwhile, the term slurry means a state in which the treated powder is dispersed in the polar solvent.

For the polar solvent that is used for washing, water is preferably used.

Water may be tap water, but it is preferable to use ion-exchanged water or pure water that has been passed through a filter or a wet-type magnetic separator.

The pH of water is preferably 4 to 10, and among others, the pH is more preferably 5 or more and 9 or less.

In regard to the liquid temperature at the time of washing, it has been confirmed that when the liquid temperature at the time of washing is low, the battery characteristics become more satisfactory. Therefore, from such a viewpoint, the liquid temperature is preferably 5 to 70° C., and among others, more preferably 60° C. or less, even more preferably 45° C. or less, and still more preferably 40° C. or less. Also, the liquid temperature is furthermore preferably 30° C. or less.

The reason why the battery characteristics become more satisfactory when the liquid temperature at the time of washing is low, can be considered that when the liquid temperature is too high, lithium in the spinel type lithium nickel manganese-containing composite oxide is ion-exchanged with protons of the ion-exchanged water, thereby lithium is removed, which affects high temperature characteristics.

In regard to the amount of the polar solvent that is brought into contact with the object to be treated (powder), it is preferable to adjust a ratio of the mass of the spinel type lithium nickel manganese-containing composite oxide with respect to a total of the mass of the polar solvent and the mass of the spinet type lithium nickel manganese-containing composite oxide (also referred to as "slurry concentration") to 10 to 70 wt %, more preferably 20 wt % or more or 60 wt % or less, and even more preferably 30 wt % or more or 50 wt % or less. When the amount of the polar solvent is 10 wt % or more, impurities such as SO4 are easily eluted, and on the contrary, when the amount of the polar solvent is 60 wt % or less, a washing effect adequate for the amount of the polar solvent can be obtained.

Meanwhile, in case of washing each of the raw materials before mixing of the raw materials and the raw material mixed powder after mixing of the raw materials, a method in which each of the raw materials or the raw material mixed powder is introduced into a washing liquid, followed by stirred, left to stand, and then a supernatant is eliminated, may be employed.

In addition, when the treated object obtained from the calcination, that is, the spinel type lithium nickel manganese-containing composite oxide is washed, it may be introduced into a washing liquid, followed by stirred, left to stand, and then a supernatant may be eliminated. For example, the spinel type lithium nickel manganese-containing composite oxide is introduced into a washing liquid, stirred for 20 minutes, and left to stand for 10 minutes. Thereafter, it is preferable to eliminate the spinel type lithium nickel manganese-containing composite oxide contained in the supernatant. By washing as described above, the amount of impurities in the spinel type lithium nickel manganese-containing composite oxide, for example, the sulfur content can be decreased.

Further, when the treated object after heat treatment is washed, the spinel type lithium nickel manganese-containing composite oxide obtained by the heat treatment may be introduced into a washing liquid, followed by stirred, left to stand, and then a supernatant may be eliminated. For example, the spinel type lithium nickel manganese-containing composite oxide is introduced into a washing liquid, stirred for 20 minutes, and left to stand for 10 minutes. Thereafter, it is preferable to eliminate the spinel type lithium nickel manganese-containing composite oxide contained in the supernatant.

<Application of Present Spinel>

The present spinel can exhibit an operating potential of 4.5 V or more (5 V-class) with respect to a Li metal reference potential, and has an excellent discharge capacity retention rate during high temperature (for example, 45° C.) cycles.

Therefore, the present spinel can be effectively used as a positive electrode active material for various lithium batteries, for example, after being crushed and classified as necessary.

In a case of using the present spinel as a positive electrode active material for various lithium batteries, a positive electrode mixture can be produced, for example, by mixing the present spinel, a conductive material formed from carbon black or the like, and a binder formed from a Teflon (registered trademark) binder or the like. Then, a lithium battery can be constituted by using such a positive electrode mixture as a positive electrode, using lithium or a material capable of intercalating and de-intercalating lithium, such as carbon, as a negative electrode, and using a solution in which a lithium salt such as lithium hexafluorophosphate (LiPF$_6$) is dissolved in a mixed solvent such as ethylene carbonate-dimethyl carbonate as a non-aqueous electrolyte.

A lithium battery constituted in this manner can be used, for example, in electronic devices such as laptop computers, mobile phones, cordless telephone handsets, video movies, liquid crystal televisions, electric shavers, portable radios, headphone stereos, backup power supplies, and memory cards, medical devices such as pacemakers and hearing aids, and driving power supplies for being mounted in electric vehicles. Among others, the lithium battery is particularly effective as various kinds of portable computers such as mobile phones, PDAs (portable information terminals), and laptop computers, electric vehicles (including hybrid vehicles), and driving power supplies for electric power storage, which require excellent cycle characteristics.

<Explanation of Words and Phrases>

In the present description, in the case of being expressed as "X to Y" (X and Y are arbitrary numbers), it includes the meaning of being "preferably greater than X" or "preferably smaller than Y" together with the meaning of being "X or more and Y or less" unless otherwise stated.

In addition, in the case of being expressed as "X or more" (X is an arbitrary number) or "Y or less" (Y is an arbitrary number), it also includes the intention to be "preferably greater than X" or "preferably less than Y".

EXAMPLES

Next, the present invention will be described in more detail by way of Examples and Comparative Examples that were actually produced. However, the present invention is not limited to the Examples described below.

Example 1

Lithium carbonate having an average particle diameter (D50) of 7 μm, electrolytic manganese dioxide having an average particle diameter (D50) of 23 μm and a specific surface area of 40 m$^2$/g, nickel hydroxide having an average particle diameter (D50) of 22 μm, titanium oxide having an average particle diameter (D50) of 1 μm, and aluminum hydroxide having an average particle diameter (D50) of 3 μm were weighed.

A polycarboxylic acid ammonium salt aqueous solution (SN Dispersant 5468, manufactured by San Nopco Ltd.) as a dispersant was added to ion-exchanged water. In so doing, an amount of the dispersant that was added was set to 6 wt % with respect to a total amount of the Li raw material, the Ni raw material, the Mn raw material, the Ti raw material, and the Al raw material, and the dispersant was sufficiently dissolved in and mixed with the ion-exchanged water. Among the raw materials that had been weighed, only the Ni raw material, the Mn raw material, and the Al raw material were added to the ion-exchanged water, in which the dispersant was dissolved in advance, and the resultant mixture was mixed and stirred to obtain a slurry. The obtained slurry was pulverized using a wet-type pulverizer at 1,300 rpm for 120 minutes. Subsequently, the Li raw material and the Ti raw material were added thereto, and the resultant mixture was mixed and stirred to prepare a slurry having a solid content concentration of 40 wt %. Further, the slurry was pulverized using a wet-type pulverizer at 1,300 rpm for 120 minutes, thereby obtaining a pulverized slurry having an average particle diameter (D50) of 0.60 μm or less.

The pulverized slurry thus obtained was granulated and dried using a thermal spray dryer (Spray Dryer "RL-10", manufactured by Ohkawara Kakohki Co., Ltd.). In so doing, a twin-jet nozzle was used for spraying, and the granulation and drying were performed under conditions in which a spray pressure was set to 0.15 MPa, a slurry supply amount was set to 400 ml/min, and a temperature was adjusted such that an outlet temperature of a drying tower became 100 to 110° C.

The obtained granulated powder was calcined, using a stationary electric furnace, at 960° C. for 37 hours under the air, and was then heat treated at 760° C. for 37 hours under the air. The calcined powder thus obtained by heat treating was classified with a sieve having a mesh size of 53 μm, and thus a spinel type lithium nickel manganese-containing composite oxide powder was obtained.

Next, 1 kg of the spinel type lithium nickel manganese-containing composite oxide powder that was obtained by collecting the powder under the sieve was introduced into a plastic beaker (capacity of 5,000 mL) which was filled with ion-exchanged water of 2,000 mL having a pH of 6 to 7, and a temperature of 25° C., and the content was stirred using a stirrer (propeller area of 33 cm2) at a rotation speed of 400 to 550 rpm for 20 minutes. After stirring, the stirring was stopped, the stirrer was taken out from the water, and the resultant stirred sample was left to stand for 10 minutes.

Then, the supernatant was eliminated by decantation, and the residual was subjected to solid-liquid separation by using a suction filtration machine (filter paper No. 131).

An additional washing was performed to the precipitate (cake) that was subjected to solid-liquid separation by using another ion-exchanged water of 2,000 mL. At this time, the conductivity of the washing water after additional washing was 1.2 mS/cm, and the water content rate of the cake was 22%.

The obtained cake was recovered, and the precipitate thus recovered was dried in an environment of 120° C. for 12 hours. Thereafter, the resultant product was dried for 7 hours in a state of being heated so as to have the product temperature of 500° C. After drying, the resultant dried product was classified using a sieve having an aperture of 53 μm, and the powder under the sieve was collected to obtain a spinel type lithium nickel manganese-containing composite oxide powder (sample).

Chemical analysis was performed with respect to the sample thus obtained, and as a result, the components were Li: 4.0 wt %, Ni: 15.9 wt %, Mn: 39.8 wt %, Ti: 5.1 wt %, and Al: 0.1 wt %.

Example 2

A spinel type lithium nickel manganese-containing composite oxide powder (sample) was obtained in the same manner as Example 1 except that the weighed values of the raw materials were changed, the calcination temperature was changed to 970° C., and the calcination time was changed to 38 hours.

Meanwhile, the conductivity of the washing water after additional washing in the solid-liquid separation was 1.1 mS/cm, and the water content rate of the cake was 20%. Chemical analysis was performed with respect to the sample thus obtained, and as a result, the components were Li: 4.0 wt %, Ni: 15.6 wt %, Mn: 40.1 wt %, Ti: 4.5 wt %, and Al: 0.4 wt %.

Example 3

A spinel type lithium nickel manganese-containing composite oxide powder (sample) was obtained in the same manner as Example 1 except that lithium carbonate having an average particle diameter (D50) of 7 μm, electrolytic manganese dioxide having an average particle diameter (D50) of 23 μm and a specific surface area of 40 m$^2$/g, nickel hydroxide having an average particle diameter (D50) of 22 μm, titanium oxide having an average particle diameter (D50) of 1 μm, aluminum hydroxide having an average particle diameter (D50) of 3 μm, and magnesium oxide having an average particle diameter (D50) of 4 μm were used, the weighed values of the raw materials were changed, the slurry having a solid content concentration of 35 wt % was adjusted, the spray pressure was changed to 0.53 MPa, the slurry supply amount was changed to 286 ml/min, and the calcination temperature was changed to 870° C.

Meanwhile, the conductivity of the washing water after additional washing in the solid-liquid separation was 1.1 mS/cm, and the water content rate of the cake was 28%. Chemical analysis was performed with respect to the sample thus obtained, and as a result, the components were Li: 4.0 wt %, Ni: 14.4 wt %, Mn: 40.8 wt %, Ti: 3.4 wt %, Al: 0.9 wt %, and Mg: 0.1 wt %.

Example 4

A spinel type lithium nickel manganese-containing composite oxide powder (sample) was obtained in the same manner as Example 1 except that the weighed values of the raw materials were changed, the slurry having a solid content concentration of 35 wt % was adjusted, the spray pressure was changed to 0.51 MPa, the slurry supply amount was changed to 316 ml/min, and the calcination temperature was changed to 860° C.

Meanwhile, the conductivity of the washing water after additional washing in the solid-liquid separation was 1.3 mS/cm, and the water content rate of the cake was 29%. Chemical analysis was performed with respect to the sample thus obtained, and as a result, the components were Li: 4.0 wt %, Ni: 14.3 wt %, Mn: 40.8 wt %, Ti: 3.0 wt %, and Al: 1.2 wt %.

Example 5

A spinel type lithium nickel manganese-containing composite oxide powder (sample) was obtained in the same manner as Example 1 except that the weighed values of the raw materials were changed, the slurry having a solid content concentration of 35 wt % was adjusted, the spray pressure was changed to 0.51 MPa, the slurry supply amount was changed to 320 ml/min, and the calcination temperature was changed to 880° C.

Meanwhile, the conductivity of the washing water after additional washing in the solid-liquid separation was 1.2 mS/cm, and the water content rate of the cake was 27%. Chemical analysis was performed with respect to the sample thus obtained, and as a result, the components were Li: 4.0 wt %, Ni: 14.6 wt %, Mn: 41.3 wt %, Ti: 2.7 wt %, and Al: 1.3 wt %.

Example 6

A spinel type lithium nickel manganese-containing composite oxide powder was obtained in the same manner as Example 3 except that lithium carbonate having an average particle diameter (D50) of 7 μm, electrolytic manganese dioxide having an average particle diameter (D50) of 23 μm and a specific surface area of 40 m$^2$/g, nickel hydroxide having an average particle diameter (D50) of 22 μm, titanium oxide having an average particle diameter (D50) of 1 μm, and aluminum hydroxide having an average particle diameter (D50) of 3 μm were used, and the weighed values of the raw materials were changed. The spinel type lithium nickel manganese-containing composite oxide powder thus obtained was pressure heat treated in oxygen-containing atmosphere using a pressurized furnace (manufactured by Hirochiku Co., Ltd.). That is, 200 g of the spinel type lithium nickel manganese-containing composite oxide powder was filled in a ceramic crucible, and the ceramic crucible was placed inside the pressurized furnace. Thereafter, oxygen gas (oxygen concentration of 99%) was flowed into the pressurized furnace to adjust an oxygen partial pressure to 0.20 MPa and an overall pressure of the treatment atmosphere to 0.21 MPa, and then the ceramic crucible was heated at a temperature-rise rate of 1.7° C./min up to 720° C. and maintained for 15 hours, and thereafter cooled at a temperature-fall rate of 0.3° C./min down to room temperature while continuing oxygen inflow, thereby obtaining a spinel type lithium nickel manganese-containing composite oxide powder (sample).

Chemical analysis was performed with respect to the spinel type lithium nickel manganese-containing composite oxide powder (sample), and as a result, the components were Li: 4.0 wt %, Ni: 14.6 wt %, Mn: 40.6 wt %, Ti: 3.5 wt %, and Al: 0.8 wt %.

Example 7

A spinel type lithium nickel manganese-containing composite oxide powder was obtained in the same manner as Example 4 except that the weighed values of the raw materials were changed. The spinel type lithium nickel manganese-containing composite oxide powder thus obtained was pressure heat treated in oxygen-containing atmosphere using a pressurized furnace (manufactured by Hirochiku Co., Ltd.). That is, 200 g of the spinel type lithium nickel manganese-containing composite oxide powder was filled in a ceramic crucible, and the ceramic crucible was placed inside the pressurized furnace. Thereafter, oxygen gas (oxygen concentration of 99%) was flowed into the pressurized furnace to adjust an oxygen partial pressure to 0.20 MPa and an overall pressure of the treatment atmosphere to 0.21 MPa, and then the ceramic crucible was heated at a temperature-rise rate of 1.7° C./min up to 730° C. and maintained for 15 hours, and thereafter cooled at a temperature-fall rate of 0.3° C./min down to room temperature while continuing oxygen inflow, thereby obtaining a spinel type lithium nickel manganese-containing composite oxide powder (sample).

Chemical analysis was performed with respect to the spinel type lithium nickel manganese-containing composite oxide powder (sample), and as a result, the components were Li: 4.0 wt %, Ni: 14.5 wt %, Mn: 40.6 wt %, Ti: 2.9 wt %, and Al: 1.3 wt %.

Example 8

A spinel type lithium nickel manganese-containing composite oxide powder was obtained in the same manner as Example 5 except that the weighed values of the raw materials were changed. The spinel type lithium nickel manganese-containing composite oxide powder thus obtained was pressure heat treated in oxygen-containing atmosphere using a pressurized furnace (manufactured by Hirochiku Co., Ltd.). That is, 200 g of the spinel type lithium manganese-containing composite oxide powder was filled in a ceramic crucible, and the ceramic crucible was placed inside the pressurized furnace. Thereafter, oxygen gas (oxygen concentration of 99%) was flowed into the pressurized furnace to adjust an oxygen partial pressure to 0.20 MPa and an overall pressure of the treatment atmosphere to 0.21 MPa, and then the ceramic crucible was heated at a temperature-rise rate of 1.7° C./min up to 740° C. and maintained for 15 hours, and thereafter cooled at a temperature-fall rate of 0.3° C./min down to room temperature while continuing oxygen inflow, thereby obtaining a spinel type lithium nickel manganese-containing composite oxide powder (sample).

Chemical analysis was performed with respect to the spinel type lithium nickel manganese-containing composite oxide powder (sample), and as a result, the components were Li: 4.0 wt %, Ni: 14.5 wt %, Mn: 41.4 wt %, Ti: 2.6 wt %, and Al: 1.4 wt %.

Example 9

A spinel type lithium nickel manganese-containing composite oxide powder was obtained in the same manner as Example 3 except that the weighed values of the raw materials were changed.

Next, 0.2 wt % of a zirconium coupling agent (Ken-React (registered trademark) NZ12, Kenrich Petrochemicals, Inc.) as a surface treating agent and 2.5 wt % of isopropyl alcohol as a solvent were mixed to prepare a dispersion in which the zirconium coupling agent was dispersed in the solvent.

Thereafter, 2.8 wt % of the dispersion was added to 100 wt % of the spinel type lithium nickel manganese-containing composite oxide powder thus obtained, and mixed using a cutter mill (Millser 720G, manufactured by Iwatani Corp.).

Then, the resultant mixture was vacuum dried at 100° C. for 1 hour, and thereafter heat treated in an atmosphere where the oxygen concentration was 98% so as to maintain the product temperature at 730° C. for 5 hours, thereby obtaining a spinel type lithium nickel manganese-containing composite oxide.

The spinel type lithium nickel manganese-containing composite oxide thus obtained by heat treating was classified with a sieve having a mesh size of 53 μm, thereby obtaining spinel type lithium nickel manganese-containing composite oxide powder (sample).

Chemical analysis was performed with respect to the spinel type lithium nickel manganese-containing composite oxide powder (sample), and as a result, the components were Li: 4.0 wt %, Ni: 14.5 wt %, Mn: 40.5 wt %, Ti: 3.3 wt %, and Al: 0.9 wt %.

Comparative Example 1

Lithium carbonate having an average particle diameter (D50) of 7 μm, electrolytic manganese dioxide having an average particle diameter (D50) of 23 μm and a specific surface area of 40 m$^2$/g, and nickel hydroxide having an average particle diameter (D50) of 22 μm were weighed so as to be the wt % values described in Table 1 respectively.

A polycarboxylic acid ammonium salt aqueous solution (SN Dispersant 5468, manufactured by San Nopco Ltd.) as a dispersant was added to ion-exchanged water. In so doing, an amount of the dispersant that was added was set to 6 wt % with respect to a total amount of the Li raw material, the Ni raw material, and the Mn raw material, and the dispersant was sufficiently dissolved in and mixed with the ion-exchanged water. The raw materials that had been weighed were added to the ion-exchanged water, in which the dispersant was dissolved in advance, and the resultant mixture was mixed and stirred to prepare a slurry having a solid content concentration of 40 wt %.

The slurry was pulverized using a wet-type pulverizer at 1,300 rpm for 120 minutes such that an average particle diameter (D50) thereof became 0.60 μm or less.

The pulverized slurry thus obtained was granulated and dried using a thermal spray dryer (Spray Dryer "RL-10", manufactured by Ohkawara Kakohki Co., Ltd.). In so doing, a twin-jet nozzle was used for spraying, and the granulation and drying were performed under conditions in which a spray pressure was set to 0.19 MPa, a slurry supply amount was set to 350 ml/min, and a temperature was adjusted such that an outlet temperature of a drying tower became 100 to 110° C.

The obtained granulated powder was calcined, using a stationary electric furnace, at 950° C. for 37 hours under the air, and was then heat treated at 750° C. for 37 hours under the air.

The calcined powder thus obtained by heat treating was classified with a sieve having a mesh size of 53 μm, and thus a spinel type lithium nickel manganese-containing composite oxide powder (sample) was obtained.

Chemical analysis was performed with respect to the sample thus obtained, and as a result, the components were Li: 3.9 wt %, Ni: 16.0 wt %, and Mn: 43.0 wt %.

Comparative Example 2

Lithium carbonate having an average particle diameter (D50) of 7 µm, electrolytic manganese dioxide having an average particle diameter (D50) of 23 µm and a specific surface area of 40 m²/g, nickel hydroxide having an average particle diameter (D50) of 22 µm, and titanium oxide having an average particle diameter (D50) of 2 µm were weighed so as to be the wt % values described in Table 1 respectively.

A polycarboxylic acid ammonium salt aqueous solution (SN Dispersant 5468, manufactured by San Nopco Ltd.) as a dispersant was added to ion-exchanged water. In so doing, an amount of the dispersant that was added was set to 6 wt % with respect to a total amount of the Li raw material, the Ni raw material, the Mn raw material, and the Ti raw material, and the dispersant was sufficiently dissolved in and mixed with the ion-exchanged water. The raw materials that had been weighed were added to the ion-exchanged water, in which the dispersant was dissolved in advance, and the resultant mixture was mixed and stirred to prepare a slurry having a solid content concentration of 40 wt %. The slurry was pulverized using a wet-type pulverizer at 1,300 rpm for 60 minutes such that an average particle diameter (D50) thereof became 0.60 µm or less.

The pulverized slurry thus obtained was granulated and dried using a thermal spray dryer (Spray Dryer "RL-10", manufactured by Ohkawara Kakohki Co., Ltd.). In so doing, a twin-jet nozzle was used for spraying, and the granulation and drying were performed under conditions in which a spray pressure was set to 0.46 MPa, a slurry supply amount was set to 250 ml/min, and a temperature was adjusted such that an outlet temperature of a drying tower became 100 to 110° C.

The obtained granulated powder was calcined, using a stationary electric furnace, at 800° C. for 37 hours under the air.

The calcined powder thus obtained was crushed using a pestle, and was classified with a sieve having a mesh size of 53 µm, thereby obtaining a spinel type lithium nickel manganese-containing composite oxide powder (sample). Chemical analysis was performed with respect to the sample thus obtained, and as a result, the components were Li: 3.9 wt %, Ni: 15.9 wt %, Mn: 39.5 wt %, and Ti: 4.9 wt %.

Comparative Example 3

As raw materials, lithium hydroxide, electrolytic manganese dioxide, nickel hydroxide, titanium oxide, and aluminum hydroxide were weighed so as to be the wt % values described in Table 1. These raw materials were pulverized and mixed in a mortar for 5 hours or more, and the sample after mixing was then calcined at 900° C. for 12 hours under the air. The sample thus obtained by calcining was pulverized and mixed again, and was then calcined at 700° C. for 12 hours in an oxygen atmosphere. Thereafter, the calcined powder was classified with a sieve having a mesh size of 25 µm, thereby obtaining a spinel type lithium nickel manganese-containing composite oxide powder (sample). Chemical analysis was performed with respect to the sample thus obtained, and as a result, the components were Li: 3.7 wt %, Ni: 15.7 wt %, Mn: 38.0 wt %, Ti: 4.3 wt %, and Al: 0.4 wt %.

<Method for Measuring Various Physical Property Values>

Physical property values of the spinel type lithium nickel manganese-containing composite oxide powders (samples) obtained in Examples and Comparative Examples were measured as follows.

(Chemical Analysis)

For each of the spinel type lithium nickel manganese-containing composite oxide powders (samples) obtained in Examples and Comparative Examples, the content of the respective elements was measured by inductively coupled plasma (ICP) emission spectroscopy.

Further, in Table 2, the composition ratios of the 5 V-class spinel type lithium nickel manganese-containing composite oxide exhibiting an operating potential of 4.5 V or more (5 V-class) with respect to a Li metal reference potential were described from the contents of Li, Ni, Mn, Ti, Al, and M elements.

In addition, the sulfur content and the amount of Ca were also measured in the same manner as the above.

(Amount of Na and Amount of K)

An amount of Na and an amount of K in each of the spinel type lithium nickel manganese-containing composite oxide powders (samples), which were obtained in Examples and Comparative Examples, were measured by atomic absorption spectroscopy.

(D50)

For each of the spinel type lithium nickel manganese-containing composite oxide powders (samples) obtained in Examples and Comparative Examples, the sample (powder) was introduced into an aqueous solvent using an automatic sample supply machine for laser diffraction particle size distribution measuring apparatus ("Microtrac SDC", manufactured by Nikkiso Co., Ltd.), and the sample was irradiated for 360 seconds with ultrasonic waves of 40 W at a flow rate of 40%. Subsequently, the particle size distribution was measured using a laser diffraction particle size distribution measuring apparatus "MT3000II" manufactured by Nikkiso Co., Ltd., and a D50 value was measured from a chart of the volume-based particle size distribution thus obtained.

Meanwhile, at the time of measurement, the watersoluble solvent was filtered through a filter having a pore size of 60 µm, and the average value obtained by making two measurements under the conditions of a solvent refractive index of 1.33, penetration for the particle penetrability conditions, a particle refractive index of 2.46, a non-spherical shape, a measurement range of 0.133 to 704.0 µm, and a measurement time of 30 seconds, was defined as D50.

(Specific Surface Area)

The specific surface area of each of the spinel type lithium nickel manganese-containing composite oxide powders (samples) obtained in Examples and Comparative Examples was measured as follows.

First, 2.0 g of the sample (powder) was weighed in a glass cell (standard cell) for an automatic specific surface area analyzer, Macsorb (manufactured by Mountech Co., Ltd.), and was set in an auto sampler. The inside of the glass cell was replaced by a nitrogen gas, and then a heat treatment was performed at 250° C. for 15 minutes in the nitrogen gas atmosphere. Thereafter, it was cooled for 4 minutes while allowing a mixed gas of nitrogen and helium to flow. After cooling, the sample (powder) was measured by a BET one-point method.

Meanwhile, as the adsorption gas in the cooling and measurement, a mixed gas of 30% of nitrogen and 70% of helium was used.

(Tap Density)

The powder packing density was determined, when 30 g of each of the spinel type lithium nickel manganese-containing composite oxide powders (samples) obtained in Examples and Comparative Examples was put in a 150-ml glass measuring cylinder, and the measuring cylinder was tapped 350 times in a stroke of 60 mm using a shaking specific gravity meter (KRS-409, manufactured by Kuramochi Kagaku Kikai Seisakusho K.K.).

(Identification of Crystal Structure and Lattice Constant)

The XRD measurement was performed under the following measurement condition 1 using an XRD measurement apparatus (apparatus name "Ultima IV", manufactured by Rigaku Corporation) to obtain an XRD pattern. In regard to the obtained XRD pattern, the crystal phase information was determined using an integrated X-ray powder diffraction software PDXL (manufactured by Rigaku Corporation), and was refined by the WPPF (Whole powder pattern fitting) method to obtain a lattice constant. Here, on the assumption that the crystal phase information is attributed to a cubic crystal of a space group Fd-3m (Origin Choice 2), and the 8a site is occupied by Li, the 16d site is occupied by Mn, M1 element, M2 element, and an excessive Li content a, and the 32e site is occupied by O, a seat occupancy and an atomic displacement parameter B on each site were fixed to 1, and the calculation was repeatedly performed until Rwp and S which represent the degree of coincidence of an observed intensity with a calculated intensity converged. The observed intensity and the calculated intensity are sufficiently coincident, which means that the obtained sample is not limited to the space group, and there is a high reliability for the obtained sample to have a spinel type crystal structure.

=XRD Measurement Condition 1=X-ray source: CuKα (line focus), wavelength: 1.541836 Å

Operation axis: 2θ/θ, measurement method: continuous, counting unit: cps

Initiation angle: 15.0°, termination angle: 120.0°, number of integration times: 1 time Sampling width: 0.01°, scanning speed: 1.0°/min Voltage: 40 kV, current: 40 mA Divergence slit: 0.2 mm, divergence vertical restriction slit: 2 mm Scattering slit: 2°, light-receiving slit: 0.15 mm Offset angle: 0°

Goniometer radius: 285 mm, optical system: focusing method

Attachment: ASC-48

Slit: slit for D/teX Ultra

Detector: D/teX Ultra

Incident-monochro: CBO

Ni-Kβ filter: None

Speed of revolution: 50 rpm (Strain)

The measurement of an X-ray diffraction pattern for obtaining the strain was performed under the following measurement condition 2 using an X-ray diffractometer (D8 ADVANCE, manufactured by Bruker AXS K.K.) using a Cu-Kα ray.

Peaks in the X-ray diffraction pattern obtained from a range of diffraction angle 2θ=10 to 120° were analyzed using an analysis software (product name "Topas Version 3") to obtain the strain.

Meanwhile, on the assumption that the crystal structure is attributed to a cubic crystal of a space group Fd-3m (Origin Choice 2), and Li is present at the 8a site, Mn, Ti element, Al element, M element, and an excessive Li content are present at the 16d site, and the 32e site is occupied by O, a parameter Beq. was fixed to 1, a fraction coordinate and a seat occupancy of O in the 32e site was set as a variable, and the calculation was repeatedly performed until the index Rwp, which represents the degree of coincidence of an observed intensity with a calculated intensity, converged to Rwp<10.0 as a guide. Incidentally, the crystallite size and the strain were analyzed by using Gauss function to obtain the strain.

=XRD Measurement Condition 2=Ray source: CuKα, operation axis: 2θ/θ, measurement method: continuous, counting unit: cps Initiation angle: 10°, termination angle: 120°

Detector: PSD

Detector Type: VANTEC-1

High Voltage: 5,585 V

Discr. Lower Level: 0.25 V

Discr. Window Width: 0.15 V

Grid Lower Level: 0.075 V

Grid Window Width: 0.524 V

Flood Field Correction: Disabled

Primary radius: 250 mm

Secondary radius: 250 mm

Receiving slit width: 0.1436626 mm

Divergence angle: 0.3°

Filament Length: 12 mm

Sample Length: 25 mm

Receiving Slit Length: 12 mm

Primary Sollers: 2.623°

Secondary Sollers: 2.623°

Lorentzian, 1/Cos: 0.004933548 Th

<Evaluation of Battery>

By using each of the spinel type lithium nickel manganese-containing composite oxide powders (samples) produced in Examples and Comparative Examples as positive electrode active materials, a 2032-type coin battery, a cell for electrochemical evaluation, TOMCEL (registered trademark), illustrated in FIG. 1, and a laminate-type battery were produced, and the following battery performance evaluation test, rate characteristics evaluation test, cycle characteristics evaluation test, gas generation evaluation test, and thermal stability evaluation test were performed using these batteries.

(Production of Coin Battery)

89 parts by mass of each of the spinel type lithium nickel manganese-containing composite oxide powders (samples) produced in Examples and Comparative Examples as a positive electrode active material, 5 parts by mass of acetylene black, and 6 parts by mass of polyvinylidene fluoride (PVDF) were weighed and mixed, and 100 parts by mass of 1-methyl-2-pyrrolidone (NMP) was added thereto to prepare a positive electrode mixture slurry (solid content concentration of 50% by mass) using a planetary stirring and defoaming apparatus (MAZERUSTAR KK-50S, manufactured by Kurabo Industries Ltd.).

In so doing, the PVDF was dissolved in the NMP in advance, and the positive electrode active material and the acetylene black were added thereto. The resultant mixture was then solid-kneaded to prepare a positive electrode mixture slurry (solid content concentration of 50% by mass).

This positive electrode mixture slurry was coated on an aluminum foil which serves as a current collector using a coating machine at a conveying speed of 20 cm/min, and was then heated using the coating machine such that the temperature was maintained at 70° C. for 2 minutes. Thereafter, the resultant heated product was dried such that the temperature was maintained at 120° C. for 2 minutes to form a positive electrode mixture layer, thereby obtaining an aluminum foil having the positive electrode mixture layer. Next, this aluminum foil having the positive electrode mixture layer was punched to a size of 50 mm×100 mm by an electrode, and was press-consolidated using a roll-press machine at a linear pressure of 3 t/cm. The resultant consolidated foil was then punched to a size of φ13 mm. Next, the resultant punched foil was heated up from room temperature to 200° C. in a vacuum state, and was heated and dried such that the temperature was maintained at 200° C. for 6 hours, thereby serving as a positive electrode.

A negative electrode was adopted as Li metal with a size of φ14 mm×thickness of 0.6 mm, and a separator that was impregnated with an electrolytic solution prepared by dissolving $LiPF_6$ in a carbonate-based mixed solvent so as to be 1 mol/L, was placed, thereby producing a 2032-type coin battery.

(Battery Performance Evaluation Test)

The 2032-type coin battery prepared as described above was left to stand for 12 hours, and was then subjected to an initial activation using a method described in the following. The battery was charged at 25° C. in a 0.1 C constant current/constant potential up to 4.999 V, and thereafter discharged in a 0.1 C constant current down to 3.0 V. This process was repeated in three cycles. Here, the current value actually set was calculated from the content of the positive electrode active material in the positive electrode. In the above evaluation, the discharge capacity in a range of 4.999 to 3.0 V in 0.1 C was obtained.

(Rate Characteristics Evaluation Test)

A rate characteristics evaluation test was performed using the coin battery after being evaluated the discharge capacity as described above. The battery was charged at 25° C. in a 0.1 C constant current/constant potential up to 4.999 V, and thereafter discharged in a 2 C constant current down to 3.0 V. In the above evaluation, the discharge capacity in a range of 4.999 to 3.0 V in 2 C was obtained. The discharge capacity in 2 C/the discharge capacity in 0.1 C×100 was calculated to be served as an index of the rate characteristics. Meanwhile, the relative values were listed in Table 3 when the value of Comparative Example 2 was set at 100.

(Evaluation of 45° C. Cycle Characteristics)

A positive electrode for the coin battery was prepared in the same manner as the above. A negative electrode sheet (electrode capacity of 1.6 mAh/cm$^2$, manufactured by Piotrek Co., Ltd.) on which natural spherical graphite was coated, was used as a negative electrode, and was punched to a size of φ14 mm. A separator that was impregnated with an electrolytic solution prepared by dissolving $LiPF_6$ in a carbonate-based mixed solvent so as to be 1 mol/L, was placed, thereby producing a 2032-type coin battery.

The 2032-type coin battery prepared as described above was left to stand for 12 hours, and was then subjected to an initial activation using a method described in the following. The battery was charged at 25° C. in a 0.1 C constant current/constant potential up to 4.9 V, and thereafter discharged in a 0.1 C constant current down to 2.9 V. This process was repeated in three cycles. Here, the current value actually set was calculated from the content of the positive electrode active material in the positive electrode.

A charge and discharge test was performed using the coin battery after being subjected to the initial activation as described above, and the high-temperature cycle ability was evaluated according to the following method. A cell was put in an environmental testing chamber whose environmental temperature at which the cell is charged and discharged was set at 45° C. to be able to be charged and discharged. The cell was left to stand for 4 hours such that the cell temperature became the environmental temperature, and thereafter, with the charge and discharge range being set at 4.9 to 2.9 V, the first-cycle charge and discharge was performed in which charge was performed in a 0.1 C constant current/constant potential and discharge was performed in a 0.1 C constant current, and the charge and discharge cycle was then performed 200 times at 1 C. C rate was calculated on the basis of 25° C. in the initial activation and the discharge capacity at third cycle.

The percentage (%) of the value obtained by the dividing discharge capacity at 200th cycle by the discharge capacity at 2nd cycle was obtained as a value for high-temperature charge-discharge cycle ability.

In Table 3, the value for high-temperature charge-discharge cycle ability from each of Examples and Comparative Examples was described as a relative value when the value for high-temperature charge-discharge cycle ability of Comparative Example 2 was set at 100.

(Production of Laminate-Type Battery)

89 parts by mass of each of the spinel type lithium nickel manganese-containing composite oxide powders (samples) produced in Examples and Comparative Examples as a positive electrode active material, 5 parts by mass of acetylene black, and 6 parts by mass of polyvinylidene fluoride (PVDF) were weighed and mixed, and 100 parts by mass of 1-methyl-2-pyrrolidone (NMP) was added thereto to prepare a positive electrode mixture slurry (solid content concentration of 50% by mass) using a planetary stirring and defoaming apparatus (MAZERUSTAR KK-50S, manufactured by Kurabo Industries Ltd.).

In so doing, the PVDF was dissolved in the NMP in advance, and the positive electrode active material and the acetylene black were added thereto. The resultant mixture was then solid-kneaded to prepare a positive electrode mixture slurry (solid content concentration of 50% by mass).

This positive electrode mixture slurry was coated on an aluminum foil which serves as a current collector using a coating machine at a conveying speed of 20 cm/min, and was then heated using the coating machine such that the temperature was maintained at 70° C. for 2 minutes. Thereafter, the resultant heated sample was dried such that the temperature was maintained at 120° C. for 2 minutes to form a positive electrode mixture layer, thereby obtaining an aluminum foil having the positive electrode mixture layer. Next, this aluminum foil having the positive electrode mixture layer was punched to a size of 50 mm×100 mm by an electrode, and was press-consolidated using a roll-press machine at a linear pressure of 3 t/cm. The resultant consolidated foil was then punched into a square of 40 mm×29 mm Next, the resultant punched foil was heated up from room temperature to 200° C. in a vacuum state, and was heated and dried such that the temperature was maintained at 200° C. for 6 hours, thereby serving as a positive electrode.

The positive electrode sheet thus obtained was served as a positive electrode, and a negative electrode sheet (electrode capacity of 1.6 mAh/cm$^2$, manufactured by Piotrek Co., Ltd.) on which natural spherical graphite was coated was cut to a size of 3.1 cm×4.2 cm to serve as a negative electrode. A separator (porous polyethylene film) that was impregnated with an electrolytic solution prepared by dissolving $LiPF_6$ in a carbonate-based mixed solvent so as to be 1 mol/L, was interposed between the positive electrode and the negative electrode, thereby producing a laminate-type battery.

(Gas Generation Evaluation Test)

The laminate-type battery produced by the method described above was left to stand for 12 hours, and then the battery was charged to 4.9 V at 25° C. in a 0.05 C constant current/constant potential, and thereafter discharged to 2.9 V in a constant current. Thereafter, the measurement environment temperature was set to 45° C., and the laminate-type battery was left to stand for 4 hours. Subsequently, the battery was charged to 4.9 V at 0.05 C and maintained the voltage for 7 days, and thereafter discharged to 2.9 V. The amount of gas generation (mL) generated up to this stage was measured by a volumetric immersion method (solvent replacement method based on Archimedes' principle). The amount of gas generation per positive electrode active material amount (mL/g) was calculated from the obtained gas generation amount and the positive electrode active material amount in the positive electrode sheet. Here, the results were listed in Table 3 when the value of Comparative Example 1 was set at 100 as an index.

(Evaluation of Thermal Stability)

89 parts by mass of each of the spinel type lithium nickel manganese-containing composite oxide powders (samples) produced in Examples and Comparative Examples, 5 parts by mass of acetylene black, and 6 parts by mass of polyvinylidene fluoride (PVDF) were weighed and mixed, and 100 parts by mass of 1-methyl-2-pyrrolidone (NMP) was added thereto to prepare a positive electrode mixture slurry (solid content concentration of 50% by mass) using a planetary stirring and defoaming apparatus (MAZERUSTAR KK-50S, manufactured by Kurabo Industries Ltd.).

In so doing, the PVDF was dissolved in the NMP in advance, and the positive electrode active material and the acetylene black were added thereto. The resultant mixture was then solid-kneaded to prepare a positive electrode mixture slurry (solid content concentration of 50% by mass).

This positive electrode mixture slurry was coated on an aluminum foil which serves as a current collector using a coating machine at a conveying speed of 20 cm/min, and was then heated using the coating machine such that the temperature was maintained at 70° C. for 2 minutes. Thereafter, the resultant heated sample was dried such that the temperature was maintained at 120° C. for 2 minutes to form a positive electrode mixture layer, thereby obtaining an aluminum foil having the positive electrode mixture layer. Next, this aluminum foil having the positive electrode mixture layer was punched to a size of 50 mm×100 mm by an electrode, and was press-consolidated using a roll-press machine at a linear pressure of 3 t/cm. The resultant consolidated foil was then punched to a size of φ16 mm, thereby serving as a positive electrode.

Next, the resultant punched foil was heated up from room temperature to 200° C. in a vacuum state, and was heated and dried such that the temperature was maintained at 200° C. for 6 hours, thereby serving as a positive electrode.

In addition, the average value of the weight of the aluminum foil of φ16 mm was determined in advance, and the weight of the positive electrode mixture was determined by subtracting the weight of the aluminum foil from the weight of the positive electrode. Further, the content of the positive electrode active material was determined from the mixing ratio of the spinal type lithium nickel manganese-containing composite oxide powder (positive electrode active material), the acetylene black, and the PVDF.

A negative electrode was adopted as Li metal with a size of φ19 mm×thickness of 0.6 mm, and a separator that was impregnated with an electrolytic solution prepared by dissolving $LiPF_6$ in a carbonate-based mixed solvent so as to be 1 mol/L, was placed, thereby producing a cell for electrochemical evaluation, TOMCEL (registered trademark), illustrated in FIG. 1.

The cell for electrochemical evaluation prepared as described above was left to stand for 12 hours, and was then charged by a procedure described in the following.

The C rate was calculated using the content of the positive electrode active material in the positive electrode. The cell was charged at 25° C. in a 0.1 C constant current/constant potential up to 4.999 V (charging was completed with a current value of 0.02 C), and thereafter discharged in a 0.1 C constant current down to 3.0 V.

This process was repeated in three cycles, and at the fourth cycle, the cell was charged at 25° C. in a 0.1 C constant current/constant potential up to 4.999 V (charging was completed with a current value of 0.02 C).

The charged cell for electrochemical evaluation was disassembled in a glove box. The positive electrode was taken out, and was punched to obtain 6 sheets of 4φ. The punched 6 sheets of 4φ were put into a high-pressure container, and 1 µL of the electrolytic solution was added dropwise. The high-pressure container was hermetically closed, and was left to stand for a night in order for the positive electrode to be impregnated with the electrolytic solution.

The high-pressure container, into which the positive electrode was put, was set to a DSC measuring apparatus (DSC3300S, manufactured by MAC Science Corporation), and a flow of an Ar gas was set to 100 ml/min so as to be an Ar atmosphere. Under the Ar flow, a temperature was raised to 350° C. at a rate of 5° C./min, and a quantity of heat was measured. At this time, a temperature, at which the maximum quantity of heat was generated, was set as an exothermic peak temperature (° C.), the temperature in Comparative Example 2 was set as ±0° C., and a shifted temperature was described with a sign "+" when the temperature was shifted toward a high-temperature side and with a sign "−" when the temperature was shifted toward a low-temperature side.

TABLE 1

| | Example 1 | Example 2 | Example 3 | Example 4 | Example 5 | Example 6 | Example 7 | Example 8 | Example 9 | Comparative Example 1 | Comparative Example 2 | Comparative Example 3 |
|---|---|---|---|---|---|---|---|---|---|---|---|---|
| Li (1 + a) | 1.03 | 1.02 | 1.04 | 1.03 | 1.03 | 1.04 | 1.03 | 1.03 | 1.04 | 1.04 | 1.03 | 1.00 |
| Ni (y) | 0.48 | 0.48 | 0.44 | 0.44 | 0.44 | 0.45 | 0.44 | 0.44 | 0.45 | 0.51 | 0.49 | 0.50 |
| Mn (x) | 1.29 | 1.31 | 1.33 | 1.33 | 1.34 | 1.33 | 1.33 | 1.34 | 1.33 | 1.46 | 1.30 | 1.30 |
| Ti (b) | 0.19 | 0.17 | 0.13 | 0.11 | 0.10 | 0.13 | 0.11 | 0.10 | 0.12 | 0 | 0.18 | 0.17 |
| Al (z) | 0.01 | 0.02 | 0.00 | 0.08 | 0.09 | 0.05 | 0.09 | 0.09 | 0.00 | 0 | 0 | 0.03 |
| M element (α) | 0 | 0 | 0.01 | 0 | 0 | 0 | 0 | 0 | 0 | 0 | 0 | 0 |
| 2 − a − b − y − z − α | 1.29 | 1.31 | 1.32 | 1.34 | 1.34 | 1.33 | 1.33 | 1.34 | 1.33 | 1.46 | 1.30 | 1.30 |
| b/a | 6.7 | 7.0 | 3.3 | 3.7 | 3.3 | 3.3 | 3.7 | 3.3 | 3.0 | 0 | 7.3 | — |
| b + z + α | 0.20 | 0.19 | 0.20 | 0.19 | 0.19 | 0.18 | 0.20 | 0.19 | 0.18 | 0 | 0.18 | 0.20 |
| z/b | 0.05 | 0.14 | 0.46 | 0.73 | 0.00 | 0.38 | 0.82 | 0.00 | 0.50 | | | 0.18 |
| z/y | 0.02 | 0.05 | 0.14 | 0.18 | 0.20 | 0.11 | 0.20 | 0.20 | 0.13 | — | — | 0.06 |

TABLE 2

|   |       | Example 1 | Example 2 | Example 3 | Example 4 | Example 5 | Example 6 | Example 7 | Example 8 | Example 9 | Comparative Example 1 | Comparative Example 2 | Comparative Example 3 |
|---|-------|-----------|-----------|-----------|-----------|-----------|-----------|-----------|-----------|-----------|----------------------|----------------------|----------------------|
| S  | wt. % | 0.01 | 0.01 | 0.01 | 0.03 | 0.03 | 0.03 | 0.03 | 0.03 | 0.04 | 0.29 | 0.25 | 0.23 |
| Na | ppm   | 40   | 30   | 20   | 30   | 30   | 20   | 30   | 30   | 30   | 310  | 380  | 150  |
| K  | ppm   | 20   | 20   | 20   | 20   | 10   | 20   | 20   | 10   | 20   | 240  | 260  | 240  |
| Mg | ppm   | 40   | 40   | 40   | 40   | 40   | 40   | 40   | 40   | 30   | 60   | 40   | 30   |
| Ca | ppm   | 90   | 90   | 120  | 130  | 130  | 120  | 130  | 130  | 110  | 160  | 140  | 110  |

TABLE 3

|   |   | Example 1 | Example 2 | Example 3 | Example 4 | Example 5 | Example 6 | Example 7 | Example 8 | Example 9 | Comparative Example 1 | Comparative Example 2 | Comparative Example 3 |
|---|---|---|---|---|---|---|---|---|---|---|---|---|---|
| D50 | μm | 18 | 19 | 7 | 7 | 7 | 8 | 9 | 9 | 7 | 17 | 8 | 18 |
| SSA | m$^2$/g | 0.3 | 0.3 | 1.3 | 1.2 | 1.0 | 1.2 | 1.0 | 0.9 | 1.2 | 0.3 | 3.6 | 0.5 |
| Tap density | g/cm3 | 1.9 | 2.0 | 1.3 | 1.3 | 1.3 | 1.2 | 1.1 | 1.2 | 1.3 | 1.7 | 1.0 | 1.9 |
| Lattice constant | Å | 8.195 | 8.190 | 8.176 | 8.173 | 8.173 | 8.175 | 8.172 | 8.171 | 8.176 | 8.170 | 8.188 | 8.190 |
| Rwp |  | 4.6 | 4.6 | 5.3 | 5.2 | 5.3 | 5.5 | 5.2 | 5.2 | 5.1 | 4.3 | 4.6 | 5.0 |
| S |  | 1.7 | 1.7 | 1.7 | 1.7 | 1.7 | 1.7 | 1.6 | 1.7 | 1.7 | 2.0 | 2.1 | 1.9 |
| Strain | — | 0.10 | 0.10 | 0.01 | 0.01 | 0.01 | 0.03 | 0.04 | 0.01 | 0.35 | 0 | 0.11 | 0.40 |
| 4.999 to 3.0 V discharge capacity | mAh/g | 129 | 128 | 127 | 125 | 124 | 129 | 128 | 125 | 128 | 135 | 127 | 101 |
| Rate characteristics 2 C/0.1 C | % | 110 | 111 | 107 | 108 | 113 | 103 | 107 | 110 | 124 | 88 | 100 | 94 |
| Cycle characteristics | % | 103 | 102 | 105 | 105 | 105 | 108 | 109 | 109 | 111 | 94 | 100 | 96 |
| Amount of gas generation per positive electrode active material | % | 97 | 98 | 96 | 74 | 71 | 90 | 78 | 79 | 83 | 100 | 106 | 104 |
| DSC exothermic peak temperature shift | ±° C. | +35 | +36 | +11 | +18 | +15 | +25 | +27 | +18 | +13 | −1 | ±0 | −1 |

(Consideration)

In any of Examples 1 to 9, it was confirmed by XRD measurement that the obtained spinel type lithium nickel manganese-containing composite oxide was a 5 V-class spinel which was fitted to a crystal structure model of a cubic crystal of a space group Fd-3m (Origin Choice 2), wherein Rwp and S which represented the degree of coincidence of an observed intensity with a calculated intensity were Rwp<10 or S<2.6. In addition, from the results of the battery performance evaluation tests, it was confirmed that the obtained spinel type lithium nickel manganese-containing composite oxide had an operating potential of 4.5 V or more at a Li metal reference potential.

In any of Examples 1 to 9, it was also confirmed that the obtained spinel lithium nickel manganese-containing composite oxide was represented by a general formula [Li(Li$_a$Ni$_y$Mn$_{2-a-b-y-z-\alpha}$Ti$_b$Al$_z$M$_\alpha$)O$_{4-o}$] (where 0<a, 0<b, 0.30≤y<0.60, 0<z, 0≤α, 2-a-b-y-z-α<1.7, 3≤b/a≤8, 0.1<b+z+α, 0<z/b≤1, and M represents one or two or more metal elements selected from the group consisting of Mg, Fe, Co, Ba, Cr, W, Mo, Y, Zr, Nb, and Ce).

As a result of a number of tests performed by the inventors of the present invention in addition to the above Examples, it was found that when a composite oxide was the spinel lithium nickel manganese-containing composite oxide represented by a general formula [Li(Li$_a$Ni$_y$Mn$_{2-a-b-y-z-\alpha}$Ti$_b$Al$_z$M$_\alpha$)O$_{4-o}$] (where 0<a, 0<b, 0.30≤y<0.60, 0<z, 0≤α, 2-a-b-y-z-α<1.7, 3≤b/a≤8, 0.1<b+z+α, 0<z/b≤1, and M represents one or two or more metal elements selected from the group consisting of Mg, Fe, Co, Ba, Cr, W, Mo, Y, Zr, Nb, and Ce), cycle properties could be improved while suppressing the gas generation under high temperature environments, an exothermic peak temperature could be shifted toward a high-temperature side in the evaluation using a DSC (differential scanning calorimeter), and thermodynamical stability of a positive electrode in a fully charged state could be increased.

The invention claimed is:

1. A spinel type lithium nickel manganese-containing composite oxide represented by a general formula [Li(Li$_a$Ni$_y$Mn$_{2-a-b-y-z-\alpha}$Ti$_b$Al$_z$M$_\alpha$)O$_{4-o}$] where 0<a, 0<b, 0.30≤y<0.60, 0<z, 0≤α, 2-a-b-y-z-α<1.7, 3≤b/a≤8, 0.1<b+z+α, 0<z/b≤1, and M represents one or two or more metal elements selected from the group consisting of Mg, Fe, Co, Ba, Cr, W, Mo, Y, Zr, Nb, and Ce.

2. A spinel type lithium nickel manganese-containing composite oxide represented by a general formula [Li(Li$_a$Ni$_y$Mn$_{2-a-b-y-z-\alpha}$Ti$_b$Al$_z$M$_\alpha$)O$_{4-o}$] where 0<a≤0.20, 0.08≤b, 0.30≤y<0.60, 0<z<0.15, 0≤α, 2-a-b-y-z-α<1.7, 3≤b/a≤8, 0.1<b+z+α≤0.3, 0<z/b≤1, and M represents one or two or more metal elements selected from the group consisting of Mg, Fe, Co, Ba, Cr, W, Mo, Y, Zr, Nb, and Ce.

3. The spinel type lithium nickel manganese-containing composite oxide according to claim 1, wherein α=0 in the above general formula.

4. The spinel type lithium nickel manganese-containing composite oxide according to claim 1, wherein a molar ratio of Al with respect to a molar ratio of Ni (z/y) in the above general formula is more than 0.01.

5. The spinel type lithium nickel manganese-containing composite oxide according to claim 1, wherein a molar ratio of Al with respect to a molar ratio of Ti (z/b) in the above general formula is 0<z/b<1.

6. The spinel type lithium nickel manganese-containing composite oxide according to claim 1, wherein a sulfur impurity content measured by inductively coupled plasma (ICP) emission spectroscopy is less than 0.20 wt %.

7. The spinel type lithium nickel manganese-containing composite oxide according to claim 1, wherein a Na impurity content is less than 300 ppm.

8. The spinel type lithium nickel manganese-containing composite oxide according to claim 1, wherein a K impurity content is less than 200 ppm.

9. The spinel type lithium nickel manganese-containing composite oxide according to claim 1, wherein a Ca impurity content is less than 150 ppm.

10. The spinel type lithium nickel manganese-containing composite oxide according to claim 1, wherein a specific surface area is 0.1 $m^2$/g or more and 2.0 $m^2$/g or less.

11. The spinel type lithium nickel manganese-containing composite oxide according to claim 1, wherein an average particle diameter (D50) determined by a laser diffraction scattering type particle size distribution measurement method is 4 μm or more and 25 μm or less.

12. The spinel type lithium nickel manganese-containing composite oxide according to claim 1, wherein a tap density is 0.9 g/$cm^3$ or more.

13. The spinel type lithium nickel manganese-containing composite oxide according to claim 1, wherein a strain is less than 0.40.

14. A lithium secondary battery having the spinel type lithium nickel manganese-containing composite oxide according to claim 1 as a positive electrode active material.

15. A lithium secondary battery having the spinel type lithium nickel manganese-containing composite oxide according to claim 2 as a positive electrode active material.

* * * * *